D. RUDY, Jr.
BELT STRETCHER.
APPLICATION FILED MAY 6, 1909.
960,201.
Patented May 31, 1910.
2 SHEETS—SHEET 1.
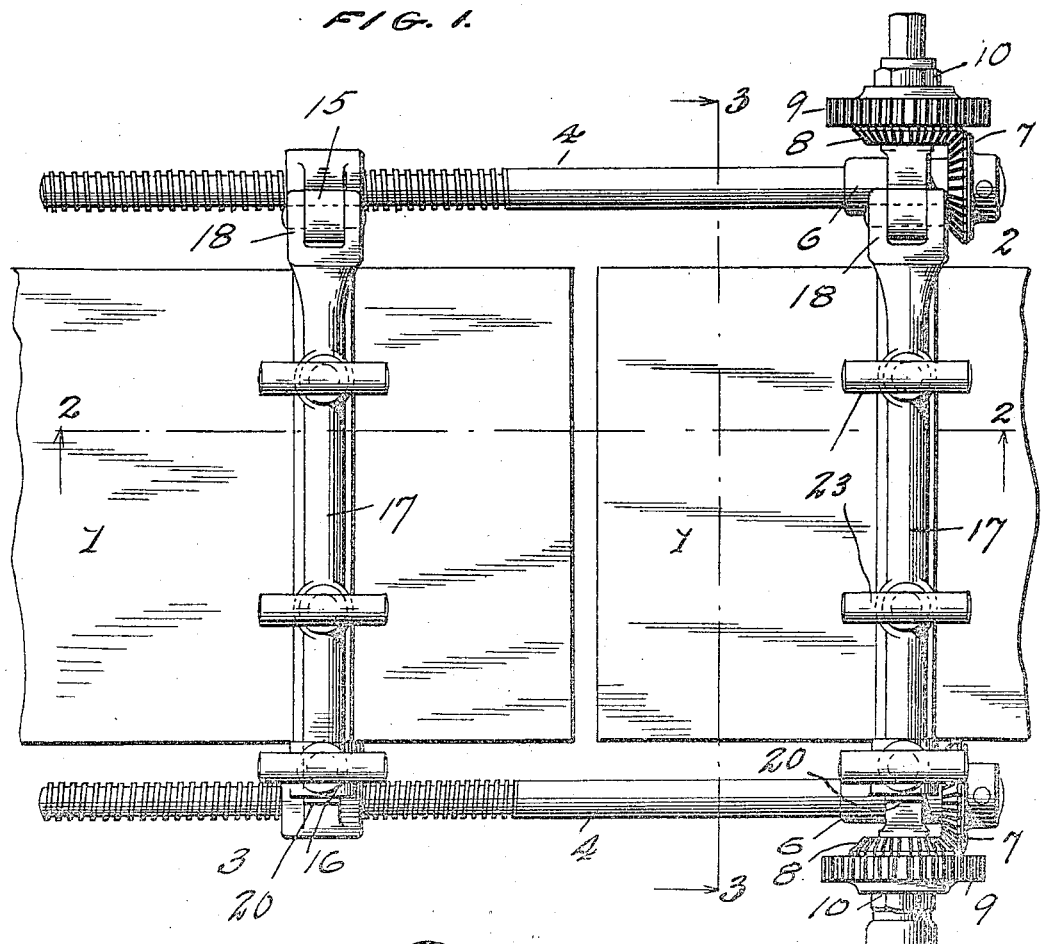
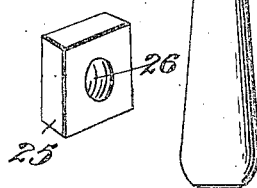
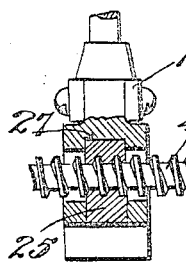
WITNESSES
INVENTOR
Attorney

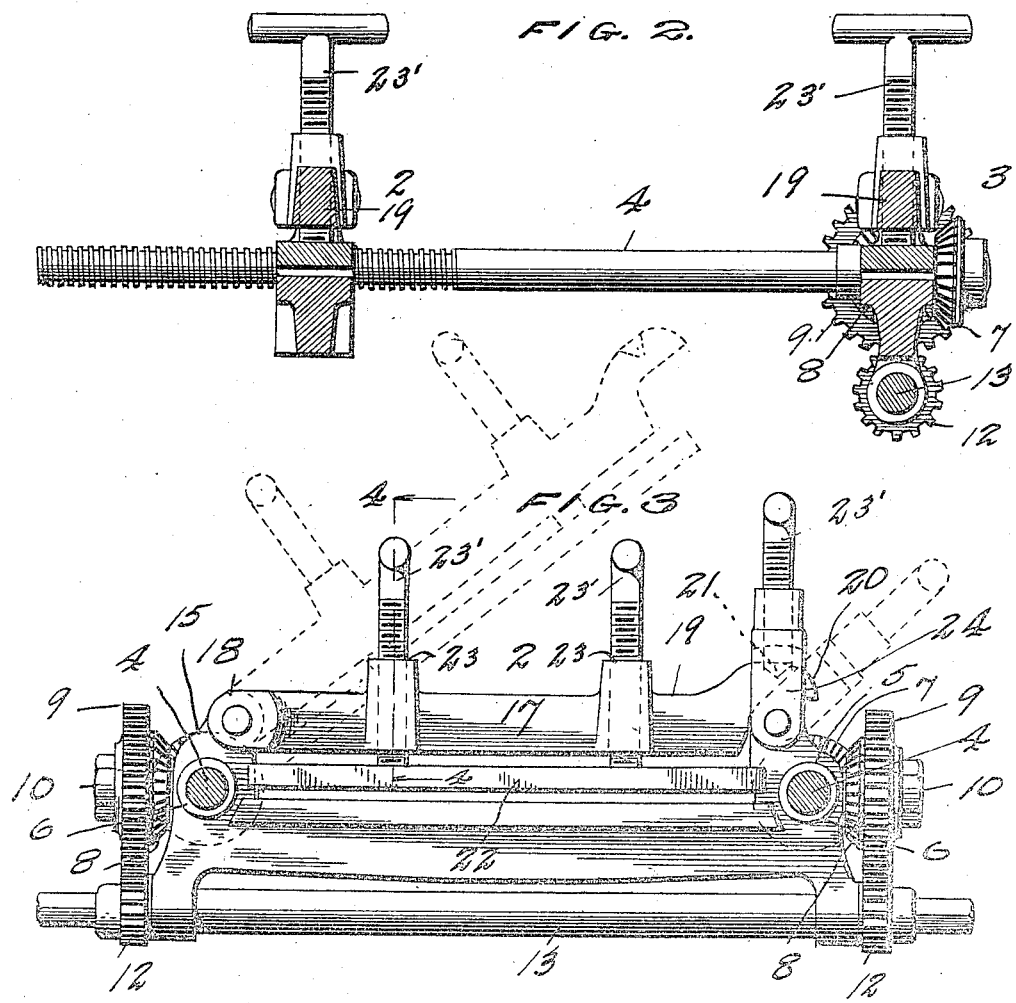

UNITED STATES PATENT OFFICE.

DANIEL RUDY, JR., OF NASHVILLE, TENNESSEE.

BELT-STRETCHER.

960,201. Specification of Letters Patent. Patented May 31, 1910.

Application filed May 6, 1909. Serial No. 494,436.

*To all whom it may concern:*

Be it known that I, DANIEL RUDY, Jr., a citizen of the United States, residing at Nashville, in the county of Davidson and State of Tennessee, have invented certain new and useful Improvements in Belt-Stretchers, of which the following is a specification.

My invention relates to improvements in belt stretchers, and the leading object of my invention is the provision of a belt stretcher of simple and durable construction which can be instantly applied to or removed from the belt, and which can be set for a certain thickness of belt or can be adjusted to fit any desired thickness and hold it securely in place.

Another object of my invention is the provision of a device of this character which will exert the maximum stretching force upon the belt with a minimum of effort on the part of the operator.

With these and other objects in view, my invention consists in a belt stretcher embodying novel features of construction and combination of parts substantially as disclosed herein.

Figure 1, represents a top plan view of my complete invention applied to a belt. Fig. 2, represents a vertical sectional view of my device on the line 2—2 of Fig. 1. Fig. 3, represents a front elevation taken on line 3—3 of Fig. 1. Fig. 4, represents a vertical sectional view of a part of the clamping means taken on the line 4—4 of Fig. 3. Fig. 5 represents a view partly in section of the means for adjusting the jaws with respect to each other, and, Fig. 6 represents a perspective view of the removable block.

In the drawings: the numeral 1, designates the belt, to which is applied my improved belt stretcher, which consists of the frame clamping member 2, and the adjustable clamping member 3, united by the pair of adjusting rods 4, said rods having one end passing through the frame 2, the openings 5 therein serving as bearings and the outward movement of the rods being prevented by collars 6 formed thereon and bearing against the frame, and their inward movement being restricted by a wheel fastened on the outer end of each rod and bearing on its inner face the beveled gears 7. Said beveled gears 7 mesh with another set of beveled gears 8, formed on the inside of the wheel 9 which is revolubly mounted upon and secured to the frame by the bolt 10. Ordinary gears are formed on the rim of the wheel 9, and these gears 11 mesh with those on the small gear wheel 12, secured to the shaft 13. The shaft 13 is mounted in bearings formed on the under side of the frame and is retained in place by the wheels 12 which are fastened on the shaft just outside its bearings, and the ends of the shaft are squared to fit the square opening in the handle 14, which can be placed on either end of the shaft to turn the shaft and operate the device. The rods 4 pass through openings in the ends of the adjustable clamping member 3 and are threaded a portion of their length to engage a removable piece 25 having a threaded opening 26 which is inserted and retained in a recess 27 in the member 3 at each end thereof, said rods being oppositely threaded. The upper face of the central portion of the member 3 and the frame member 2 is flat and is milled or checked, and at each side of said portion are the upward projecting lugs 15 and 16. The jaws 17 are hinged to the members 2 and 3, by means of pins passing through openings in the bifurcated ends 18 of the jaws, and through openings in the lugs 15, the bifurcated ends fitting against the sides of the lugs.

The jaws 17 consist of the upper bar member 19 having a bifurcated end 18 and the hooked end 20 formed with a recess 21 on its top, and of the clamping plate 22 having a flat milled under surface and grooves in its ends to engage and slide upon the lugs 15 and 16. Through the threaded openings 23 in the bar extend a pair of T bolts 23' having a threaded shank for engagement with said openings and having their lower ends provided with a shoulder resting against the top of the plate 22 and passing through openings in the plate 22 and riveted therein.

To the lug 16 is hinged by a pin passing therethrough, the clevis 24, having a threaded opening in its upper portion in which is screwed a threaded T bolt.

In operation, the jaws of my belt stretcher are swung back as illustrated by the dotted lines, Fig. 3. The end of the belt is then placed on the face of the clamping member, the jaw is swung down onto the belt, and the clevis is swung into a vertical position and the T bolt is screwed down tight upon the hooked end of the bar which fits over the lug and between the sides of the clevis, the bolt end fitting in the recess 21 on the top of the bar. The bar being thus held firmly in place, the bolts 23' are screwed down, and the shouldered portions 23ˣ thereof engage the plate 22 and force it into engagement with the belt, the operation and construction of the screws or bolts 23' being shown most clearly in Fig. 4. After both ends of the belt have been secured in this manner, the handle is placed in position and as it is revolved it causes the gears to turn the rods 24, and the screw threads thereon engage the block or piece in the recesses in the member 3 and cause it to move toward the frame 2, thus tightening and stretching the belt. When the belt has been stretched the desired amount and laced, it is only necessary to loosen the clevis T bolt and the clevis and then the clamping jaw can be swung back and the device removed, the plate remaining in adjusted position for that thickness of belt.

From the foregoing description taken in connection with the drawings, the construction and operation of my device will be readily understood and its manifold advantages be apparent to all.

It will be understood that I do not limit myself to the specific construction herein shown, but that I may make any changes or modifications thereof which come within the scope of my invention.

I claim:

1. In combination with a frame, shafts journaled therein, means carried thereby for revolving the shafts, said shafts having screw-threaded ends, blocks mounted on the shafts, and a clamping member loosely mounted on the shafts, said member having ears spanning said blocks and being adapted to be moved back and forth on the shafts by the contact of the blocks with said ears caused by the revolution of the shafts, and said clamping member and frame each having a horizontal jaw formed thereon and lying between the shafts and a lug rising above the shafts at each side of the jaw, said lug having its inner face perpendicular to the face of the jaw, a clamping plate having bifurcated ends spanning said lugs, a clamping jaw pivotally secured to one of the lugs and adapted to be clamped upon the other, and means carried by said clamping jaw for adjustably clamping the clamping plate in position.

2. In a device of the character described, the combination with a frame, of a clamping member, means for adjustably spacing them with respect to each other, a lower clamping jaw formed on each member, a lug rising at each end of the jaw and having its inner face perpendicular thereto, an upper clamping jaw pivotally secured to one of the lugs, the free end of said jaw being shaped to fit over the other lug and having a socket formed in its upper face, a clevis pivotally secured to the lug and adapted to be swung over the end of the jaw, said clevis having a threaded socket formed therein at its central portion, and a bolt engaged in said socket and adapted to be screwed down therein and be engaged in the socket in the end of the jaw to lock said jaw in position and prevent the accidental displacement of the clevis.

3. In a device of the character described, the combination with a frame, of a clamping member, means for adjusting them with respect to each other, a lower clamping jaw formed on each member, a lug rising at each end of the jaw and having its inner face perpendicular thereto, an upper clamping jaw pivotally secured to one of the lugs, the free end of said jaw being shaped to fit over the other lug and having a socket formed in its upper face, a clevis pivotally secured to the lug and adapted to be swung over the end of the jaw, said clevis having a threaded socket formed therein, a bolt engaged in said socket and adapted to be screwed down therein and be engaged in the socket in the end of the jaw to lock said jaw in position and prevent the accidental displacement of the clevis, a clamping plate extending the length of the lower clamping jaw and terminating at each end in a bifurcated portion spanning the lug, said plate having apertures formed therein, the upper jaw having a series of corresponding threaded sockets formed therein above said apertures, and bolts having threaded portions engaged in said sockets, said bolts terminating in a plane portion surmounted by a shoulder and being so disposed that the shoulder rests upon the clamping plate with the plane portion extending through the apertures and rotatably secured therein, the rotation of the bolts serving to raise and lower the plate with reference to the clamping jaws, the lugs serving to guide the plate when so moved.

In testimony whereof I affix my signature, in presence of two witnesses.

DANIEL RUDY, Jr.

Witnesses:
L. A. BAUMAN,
JAS. P. LEWIS.